United States Patent [19]

Kato et al.

[11] Patent Number: 5,625,003
[45] Date of Patent: Apr. 29, 1997

[54] GOLF BALL

[75] Inventors: Akira Kato; Kuniyasu Horiuchi, both of Kobe; Akihiko Hamada, Kakogawa, all of Japan

[73] Assignee: Sumitomo Rubber Industries, Ltd., Hyogo-ken, Japan

[21] Appl. No.: 18,206

[22] Filed: Feb. 16, 1993

[30] Foreign Application Priority Data

Feb. 17, 1992 [JP] Japan ................. 4-069237

[51] Int. Cl.$^6$ ................. C08L 23/08; C08L 37/00; C08L 33/02; A63B 37/12
[52] U.S. Cl. ................. 525/208; 525/196; 525/221; 524/908; 524/517; 260/998.14; 473/385
[58] Field of Search ................. 525/208, 196, 525/221; 273/235 R; 260/998.14; 524/908

[56] References Cited

U.S. PATENT DOCUMENTS

| | | | |
|---|---|---|---|
| 4,855,363 | 8/1989 | Mateki | 525/221 |
| 4,884,814 | 12/1989 | Sullivan | 525/221 |
| 4,898,911 | 2/1990 | Miyashita et al. | 525/201 |
| 4,965,319 | 10/1990 | Kawamoto | 525/221 |
| 4,968,752 | 11/1990 | Kawamoto et al. | 525/221 |
| 4,986,545 | 1/1991 | Sullivan | 273/235 R |
| 5,098,105 | 3/1992 | Sullivan | 273/235 R |
| 5,120,791 | 6/1992 | Sullivan | 524/908 |
| 5,206,294 | 4/1993 | Dawson | 525/196 |

FOREIGN PATENT DOCUMENTS

| | | |
|---|---|---|
| 341731 | 11/1989 | European Pat. Off. . |
| 382401 | 8/1990 | European Pat. Off. . |
| 470854 | 2/1992 | European Pat. Off. . |
| 2197654 | 5/1988 | United Kingdom . |

*Primary Examiner*—Carman J. Seccuro, Jr.
*Attorney, Agent, or Firm*—Birch, Stewart, Kolasch & Birch, LLP

[57] ABSTRACT

The present invention provides a golf ball having excellent hit feeling and control property as well as excellent flying performance and cut resistance, which comprises a core and a cover for covering the core, wherein a heated mixture of an ionomer resin and a polymer containing a glycidyl group is used as a main component of a base resin for the cover.

18 Claims, No Drawings

GOLF BALL

BACKGROUND OF THE INVENTION

1. Field of the Invention

The present invention relates to a golf ball with a cover, wherein the hit feeling and control property of the golf ball are improved.

2. Description of the Related Art

As a base resin for a cover of a golf ball, an ionomer resin has widely been used (e.g. Japanese Patent Kokai No. 49-49727), heretofore. Particularly, in almost all of two piece golf balls using a solid core, an ionomer resin is used as the base resin in the golf ball cover.

The reason for this is that the ionomer resin is superior in durability, cut resistance and impact resilience and is easily processed. Furthermore, the ionomer resin is cheap in comparison with other base resins for the cover.

However, the ionomer resin is inferior in hit feeling and control property (ease of spinning) in comparison with balata (transpolyisoprene), which is used as the cover of a thread wound golf ball, because of its very high hardness and stiffness.

As a result, attempts at improving hit feeling and control property have been made by softening the ionomer resin with various means, however, satisfactory results are not obtained at present.

SUMMARY OF THE INVENTION

Under these circumstances, the present inventors have intensively studied about a base resin for the cover. As a result, it has been found that a golf ball having excellent hit feeling and control property as well as excellent flying performance and cut resistance can be obtained, by using a heated mixture composed of an ionomer resin and a polymer containing a glycidyl group as the main component of a base resin for the cover, and the present invention has been completed.

The main object of the present invention is to provide a golf ball having improved hit feeling and control property.

This object, as well as other objects and advantages of the present invention, will become apparent to those skilled in the art from the following description.

According to the present invention, there is provided a golf ball comprising a core and a cover for covering the core, a base resin of said cover being composed of a heated mixture of an ionomer resin and a polymer containing a glycidyl group as a main component.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

A polymer containing a glycidyl group has elastomeric properties and, therefore, when the polymer containing the glycidyl group is mixed with an ionomer resin with heating, the ionomer resin is softened and the hit feeling and control property are improved. Furthermore, deterioration of flying performance and cut resistance are prevented and these desirable properties are suitably maintained.

In the present invention, the ionomer resin may be any one which is used for the cover of a golf ball, and one or more sorts of them can be used in combination.

As the ionomer resin used for the cover, for example, there is a resin of a copolymer comprising 10 to 20% by weight of $\alpha$, $\beta$-unsaturated carboxylic acid having 3 to 8 carbon atoms and 80 to 90% by weight of $\alpha$-olefin, a part of a carboxyl group in said copolymer being neutralized with metal ion.

Examples of the ionic ethylene-methacrylic acid copolymer based ionomer resin include HI-MILAN 1605 (of the type neutralized by sodium ion), HI-MILAN 1706 (of the type neutralized by zinc ion), HI-MILAN 1707 (of the type neutralized by sodium ion), HI-MILAN 1705 (of the type neutralized by zinc ion) which are manufactured by Mitsui DuPont Polychemicals Co.; SURLIN 7930 (of the type neutralized by lithium ion), SURLIN 7940 (of the type neutralized by lithium ion) which are manufactured by E. I. DuPont de Nemours & Co. and the like.

Examples of the ionic ethylene-acrylic acid copolymer based ionomer resin include a resin that is commercially available from EXXON Co. under the trade name of IOTEK.

As the polymer containing the glycidyl group, for example, there are terpolymers of olefins with vinyl compounds and unsaturated epoxy compounds, bipolymers of olefins with unsaturated epoxy compounds and the like.

Examples of the olefins include ethylene, propylene, butene-1, iso-butylene, pentene-1, hexene-1, heptene-1, octene-1, dodecene-1, 4-methyl-pentene-1 and the like. Examples of the vinyl compound include vinyl acetate, styrene-methylmethacrylate, methyl acrylate, acrylic acid, ethyl acrylate, vinyl chloride, $\alpha$-methylstyrene, divinylbenzene, tetrafluoroethylene, vinylidene chloride, acrylonitrile, acrylic amide and the like.

As the unsaturated epoxy compound, for example, there are unsaturated glycidyl esters, unsaturated glycidyl ethers, epoxyalkenes, p-glycidylstyrenes and the like. Examples thereof include glycidyl methacrylate, glycidyl acrylate, glycidyl itaconates, butenecarboxylates, allylglycidyl ether, 2-methylallylglycidyl ether, 3,4-epoxybutene, 3,4-epoxy-3-methyl-1-butene, 3,4-epoxy-1pentene, 3,4-epoxy-3-methylpentene, 5,6-epoxy-1-hexene, vinylcyclohexene monooxide, p-glycidylstyrene and the like.

Preferred examples of the polymer containing the glycidyl group include ethylene-vinyl acetate-glycidyl methacrylate terpolymer, ethylene-methyl acrylate-glycidyl methacrylate terpolymer, ethylene-glycidyl methacrylate bipolymer, mixtures thereof, and the like. In these terpolymer and bipolymer, the amount of ethylene, vinyl acetate or methyl acrylate and glycidyl methacrylate are preferably 60 to 90% by weight, 0 to 35% by weight, 1 to 15% by weight, respectively.

Examples of the marketing product of the ethylenevinyl acetate-glycidyl methacrylate terpolymer include BONDFAST 7B (trade name) manufactured by Sumitomo Chemical Co, examples of the marketing product of the ethyleneglycidylmethacrylate bipolymer include BONDFAST E (trade name) manufactured by Sumitomo Chemical Co., and examples of the marketing product of the ethylene-methyl acrylateglycidyl methacrylate terpolymer include BONDFAST 7L (trade name) manufactured by Sumitomo Chemical Co.

The polymer containing the glycidyl group has elastomeric properties and is superior in processability, heat stability and compatibility with the ionomer resin. The polymer softens the ionomer resin, where by the resulting mixture becomes flexible.

Since the polymer containing the glycidyl group is used for the purpose of softening the ionomer resin as described above, it is preferred that the polymer have a lower stiffness modulus than that of a conventional ionomer resin. For example, those having a stiffness modulus of not more than 2,000 kgf/cm$^2$ particularly 20 to 1,000 kgf/cm$^2$ are preferred.

When the stiffness modulus of the polymer containing the glycidyl group exceeds 2,000 kgf/cm$^2$, it becomes equal to that of a normal ionomer resin (i.e. 2,500 to 4,000 kgf/cm$^2$), and it becomes impossible to soften the ionomer resin completely.

In a heated mixture which constitutes the base resin for the cover, the mixing ratio (weight ratio) of the ionomer resin (A) to the polymer (B) containing the glycidyl group is preferably in the range of 99:1 to 50:50, particularly 98:2 to 80:20.

When the mixing ratio of the ionomer resin (A) is larger than the above range, since the amount of the polymer (B) containing the glycidyl group is small, the heated mixture can not be sufficiently softened, so that sufficient improvement of the hit feeling and control property of the golf ball cannot be obtained. When the amount of the ionomer resin (A) is smaller than the above range, properties of the ionomer resin (e.g. impact resilience, cut resistance, etc.) are deteriorated, which results in deterioration of flying performance and cut resistance of the golf ball.

In the present invention, a heated mixture of the ionomer resin and polymer containing the glycidyl group is used as the main component of the base resin for the cover. To the heated mixture, if necessary, various additives such as pigments, dispersants, antioxidants, UV absorbers, UV stabilizers and the like can be added.

Further, in the present invention, the fact that the heated mixture of the ionomer resin and polymer containing the glycidyl group is used as the main component of the base resin for the cover means that the base resin for the cover is only composed of the heated mixture, or that the base resin for the cover is composed of the heated mixture, to which other resins are added in an amount within a range which does not affect properties of the heated mixture (normally, in a range of not more than 20% by weight based on the total weight of the heated mixture).

Further, in the present specification, the wording "heated mixture of the ionomer resin and polymer containing the glycidyl group", means that the mixture is produced by mixing components with heating and it does not mean that the mixture is used for the cover of the golf ball in the heated state.

The heated mixture is obtained by mixing the ionomer resin with polymer containing the glycidyl group with heating at a resin temperature of 150° to 280° C., using an extruder for plastic or an internal mixer such as plastomill, Banbury mixer, etc.

Among the above mixers, a twin-screw extruder is most suitable for mixing efficiently.

A cover composition, which is composed of the heated mixture as the main component of the base resin for the cover, is then coated on the core to obtain a golf ball.

Solid cores or thread wound core can be used. The solid cores is obtained by vulcanizing (crosslinking) a rubber composition mainly composed of a rubber, followed by integral molding. The thread wound core is obtained by winding a thread rubber on a core material.

According to the present invention, a golf ball having excellent hit feeling and control property, as well as excellent flying performance and cut resistance, can be obtained.

EXAMPLES

The following Examples further illustrate the present invention in detail, but are not to be construed to limit the scope thereof.

EXAMPLES 1 TO 3 AND COMPARATIVE EXAMPLES 1 TO 3

(1) Preparation of Core

A rubber composition wherein 35 parts by weight of zinc acrylate, 20 parts by weight of zinc oxide, 1 part of dicumyl peroxide and 0.5 parts by weight of antioxidant [YOSHINOX 425 (trade name), manufactured by Yoshitomi Seiyaku Co.] are formulated based on 100 parts by weight of polybutadiene rubber [BR-11 (trade name), manufactured by Nippon Gosei Gomu Co.] was vulcanized at 165° C. for 20 minutes to obtain a solid core. An average diameter of the resulting solid core was 38.4 mm.

(2) Preparation of Cover Composition

Formulation components shown in Table 1 were mixed and extruded by a twin-screw extruder to obtain a pellet-like cover composition.

The extrusion was conducted under the conditions of a screw diameter of 45 mm, a screw revolution speed of 200 rpm and a screw L/D of 35. The composition temperature was 220° to 260° C.

TABLE 1

| Cover composition No. | 1 | 2 | 3 | 4 | 5 | 6 |
|---|---|---|---|---|---|---|
| HI-MILAN 1605[1] | 90 | 90 | 100 | 100 | 50 | 50 |
| BONDFAST 7B[2] | 10 | — | — | — | — | — |
| BONDFAST E[3] | — | 10 | 10[4] | — | — | — |
| SURLIN AD8265[5] | — | — | — | — | 50 | — |
| SURLIN AD8269[6] | — | — | — | — | — | 50 |
| Titanium dioxide | 1.0 | 1.0 | 1.0 | 1.0 | 1.0 | 1.0 |

[1]Ionomer resin of the type neutralized by sodium ion manufactured by Mitsui Du Pont Polychemicals Co [MI (melt index): 28; stiffness modulus: about 3100 kgf/cm$^2$]
[2]Ethylene-vinyl acetate-glycidyl methacrylate terpolymer manufactured by Sumitomo Chemical Co. [composition: ethylene (83% by weight), vinyl acetate (5% by weight) and glycidyl methacrylate (12% by weight); MI: 3.0; stiffness modulus: about 300 kgf/cm$^2$]
[3]Ethylene-glycidyl methacrylate bipolymer manufactured by Sumitomo Chemical Co. [composition: ethylene (88% by weight) and glycidyl methacrylate (12% by weight); MI: 3.0; stiffness modulus: about 900 kgf/cm$^2$]
[4]"BONDFAST 7L": Ethylene-methyl acrylate-glycidyl methacrylate terpolymer manufactured by Sumitomo Chemical Co. [composition: ethylene (67% by weight), methyl acrylate (30% by weight) and glycidyl methacrylate (30% by weight); MI: 9.0; stiffness modulus: about 60 kgf/cm$^2$]
[5]Ethylene-methacrylic acid-methacrylate terpolymer of the type neutralized by sodium ion (low stiffness type) manufactured by Mitsui Du Pont Polychemicals Co. [MI: 1.9; stiffness modulus: about 700 kgf/cm$^2$]
[6]Ethylene-methacrylic acid-methacrylate terpolymer of the type neutralized by sodium ion (low stiffness type) manufactured by Mitsui Du Pont Polychemicals Co. [MI: 0.8; stiffness modulus: about 300 kgf/cm$^2$]

(3) Preparation of golf ball

The core obtained in the above process (1) was coated with the cover obtained in the above process (2) by a injection molding method to prepare a golf ball.

The ball weight, ball compression and flying distance, and the kind of a cover composition used in the preparation of a golf ball are shown in Table 2. The golf ball of Comparative Example 1 is a golf ball wherein an ionomer resin is used alone as a resin component of the cover and it is the criterion for comparison.

TABLE 2

|  | Ex. 1 | Ex. 2 | Ex. 3 | Comp. Ex. 1 | Comp. Ex. 2 | Comp. Ex. 3 |
|---|---|---|---|---|---|---|
| Cover composition No. | 1 | 2 | 3 | 4 | 5 | 6 |
| Ball weight (g) | 45.3 | 45.4 | 45.4 | 45.4 | 45.3 | 45.4 |
| Ball compression | 85 | 87 | 83 | 99 | 89 | 90 |
| Ball initial velocity (ft./sec.) | 251.1 | 252.1 | 251.0 | 252.3 | 249.7 | 249.3 |
| Flying distance (yard) | 226 | 227 | 225 | 227 | 221 | 222 |

As shown in Table 2, regarding the golf balls of Examples 1 to 3, the flying distance is 225 to 227 yard and is almost the same as that of the golf ball of Comparative Example 1. To the contrary, regarding the golf balls of Comparative Examples 2 and 3, the flying distance is shorter than that of the golf ball of the Comparative Example 1 by about 5 to 6 yards.

Regarding the golf balls of Examples 1 to 3 and Comparative Examples 1 to 3, professional golfers were asked to hit the golf balls and to evaluate the hit feeling, control property and flying distance.

As a result, regarding the golf balls of Examples 1 to 3, the hit feeling and control property are almost the same as those of the thread wound golf ball coated with the cover containing transpolyisoprene (balata) as a main component and the flying distance is also good.

On the contrary, regarding the golf ball of Comparative Example 1, the hit feeling is hard and spinning is hardly obtained and, further, the control property is inferior. Regarding the golf balls of Comparative Examples 2 and 3, the hit feeling and control property are good, but the flying resistance is inferior.

In order to examine the cut resistance of the golf balls of Examples 1 to 3 and Comparative Examples 1 to 3, the head part of the golf balls were hit at a speed of 30 m/second by a swing-robot provided with a pitching wedge (manufactured by True Temper Co.) to examine whether a cut mark has arisen or not.

As a result, regarding the golf balls of Examples 1 to 3, no cut mark was found. To the contrary, regarding the golf balls of Comparative Examples 2 and 3, a small cut mark was found.

Further, the cut resistance of the thread wound golf ball coated with the cover containing transpolyisoprene (balata) as a main component was also examined under the same conditions. As a result, a considerably large cut mark was found in the thread wound golf ball.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A golf ball comprising a core and a cover for covering said core, wherein said cover consists essentially of
   (A) a base resin consisting essentially of a mixture of (1) an ionomer resin, and (2) a copolymer containing a glycidyl group and having a stiffness modulus of 20 to 2,000 Kgf/cm$^2$, which is prepared from 60 to 90% by weight of an olefin, 0 to 35% by weight of a vinyl compound, and 1 to 15% by weight of an unsaturated epoxy compound, wherein said mixture has been heated during mixing; and
   (B) optionally one or more pigments, dispersants, antioxidants, UV absorbers, or UV stabilizers.

2. The golf ball according to claim 1, where said cover further includes one or more pigments, dispersants, antioxidants, UV absorbers, or UV stabilizers.

3. The golf ball according to claim 2, wherein said pigments, dispersants, antioxidants, UV absorbers, UV stabilizers, and mixtures thereof are contained in said base resin.

4. The golf ball according to claim 3, wherein said pigments, dispersants, antioxidants, UV absorbers, UV stabilizers, and mixtures thereof are added to said mixture of said ionomer resin and said copolymer containing a glycidyl group.

5. The golf ball according to claim 1, wherein said ionomer resin is a resin of a copolymer comprising 10 to 20% by weight of an α,β-unsaturated carboxylic acid having 3 to 8 carbon atoms and 80 to 90% by weight of α-olefin, and having a portion of said carboxyl groups in said copolymer neutralized by a metal ion.

6. The golf ball according to claim 5, wherein said metal ion is selected from the group consisting of sodium, zinc, and lithium.

7. The golf ball according to claim 1, wherein said copolymer containing a glycidyl group is selected from the group consisting of a terpolymer of an olefin, a vinyl compound, and an unsaturated epoxy compound, and a bipolymer of an olefin and an unsaturated epoxy compound.

8. The golf ball according to claim 7, wherein said olefin is selected from the group consisting of ethylene, propylene, butene-1, isobutylene, pentene-1, hexene-1, heptene-1, octene-1, dodecene-1, and 4-methylpentene-1.

9. The golf ball according to claim 7, wherein said vinyl compound is selected from the group consisting of vinyl acetate, styrene-methylmethacrylate, methyl acrylate, acrylic acid, ethyl acrylate, vinyl chloride, α-methylstyrene, divinylbenzene, tetrafluoroethylene, vinylidene chloride, acrylonitrile, and acrylic amide.

10. The golf ball according to claim 7, wherein said unsaturated epoxy compound is selected from the group consisting of glycidyl methacrylate, glycidyl acrylate, glycidyl itaconates, butenecarboxylates, allylglycidyl ether, 2-methylallylglycidyl ether, 3,4-epoxybutene, 3,4-epoxy-3-methyl-1-butene, 3,4-epoxy-1pentene, 3,4-epoxy-3-methyl-3-pentene, 5,6-epoxy-1-hexene, vinylcyclohexene monooxide, and p-glycidylstyrene.

11. The golf ball according to claim 7, wherein said copolymer containing a glycidyl group is selected from the group consisting of ethylene-vinyl acetate-glycidyl methacrylate terpolymer, ethylene-methyl acrylate-glycidyl methacrylate terpolymer, ethylene-glycidyl methacrylate, and mixtures thereof.

12. The golf ball according to claim 11, wherein said copolymer containing a glycidyl group contains ethylene in an amount of 60 to 90% by weight based on the total polymer weight.

13. The golf ball according to claim 11, wherein said copolymer containing a glycidyl group contains vinyl acetate or methyl acrylate in an amount of 0 to 35% by weight based on the total polymer weight.

14. The golf ball according to claim 11, wherein said copolymer containing a glycidyl group contains glycidyl methacrylate in an amount of 1 to 15% by weight based on the total polymer weight.

15. The golf ball according to claim 1, wherein a mixing ratio of said ionomer resin to said copolymer containing a glycidyl group is within the range of 99:1 to 50:50.

16. The golf ball according to claim 1, wherein said mixture of said ionomer resin and said copolymer containing a glycidyl group is obtained by mixing said ionomer resin with said copolymer containing a glycidyl group while heating at a resin temperature of 150° to 280° C.

17. The golf ball according to claim 1, wherein said core is selected from the group consisting of a solid core obtained by vulcanizing a rubber composition and a thread wound core obtained by winding thread rubber on a center core.

18. A golf ball comprising a core and a cover for covering said core, wherein said cover consists essentially of (A) a base resin consisting essentially of a mixture of (1) an ionomer resin, and (2) a copolymer containing a glycidyl group and having a stiffness modulus of 20 to 2,000 Kgf/cm$^2$, which is prepared from 60 to 90% by weight of an olefin, 0 to 35% by weight of a vinyl compound, and 1 to 15% by weight of an unsaturated epoxy compound, wherein said mixture has been heated during mixing.

* * * * *